Patented Sept. 2, 1924.

1,507,275

UNITED STATES PATENT OFFICE.

MICHAEL W. DUFFY, OF WYOMING, ILLINOIS.

WALL-FINISHING MATERIAL.

No Drawing. Original application filed May 2, 1921, Serial No. 466,358. Divided and this application filed April 1, 1922. Serial No. 548,857.

*To all whom it may concern:*

Be it known that I, MICHAEL W. DUFFY, a citizen of the United States, residing at Wyoming, in the county of Stark and State of Illinois, have invented new and useful Improvements in Wall-Finishing Material; and I do hereby declare that the following is a full, clear, and exact description of the invention, which will enable others skilled in the art to which it appertains to make and use the same.

This invention has reference to a new material for application as a stucco finish to surfaces to be decorated, and to a method of treatment of such material prior to its use as such.

An object of the invention is to furnish a new material for application as a rough finish to wall surfaces that will be light in weight and easily applied.

Another object of the invention is to furnish a new material for use as a stucco finish that will absorb a coloring material before its application.

Still another object is to furnish a material of a vegetable nature in granular form which being light in weight and of an absorbent nature may be readily applied to a wall by means of a moisture carrying roller pad where it will adhere to a light sizing.

A still further object is that of providing a method of treating granules of wood whereby the danger of their staining surfaces of light or delicate colors to which they are applied may be avoided.

This application is divided from my allowed application Serial No. 466,358 filed May 2, 1921.

The material used for obtaining the appearance of a rough stucco finish is that having a light weight, as compared with sand much employed, to the end that being light it can be more easily applied and will adhere better, and that it will absorb a stain, or hold upon it an oil color not possible with flinty non-absorbent material such as sand.

Such material may be granulated wood, or saw dust, more or less fine according to the finish desired, granulated cork and like vegetable substances.

Certain kinds of woods when applied to a wall of light color stain the color due to resinous matter therein liberated by moisture in the wall sizing or by moisture or oils that are used in the coat finally applied as a finish.

However, when such substances as cork are employed this objection, of course, is lacking. But since wood particles are the most easily and cheaply obtained and therefore most desirable preliminary treatment is necessary if used on walls that are to have a final finish of light color in order to eliminate tendency to stain.

I therefore treat the particles in bulk to a boiling solution of borax in any convenient way which nullifies its power to stain whereupon the raw particles thus treated either before or after having been dried may be applied to a sized wall. After the whole is dry any light colored pigment or water color may be used as a finishing coat without stain later appearing.

In order to provide a Tiffany finish for a wall of this same rough type the treated wood particles preferably after being dried are divided into batches and each batch may be stained a different color in any suitable manner, the several colors used being those, which, when mixed, will present the desired color effect in the finished wall surface. Parts of the several batches may be mixed in desired proportions for application to the wall or the batches may be separately applied to obtain the desired appearance.

I claim:

1. The method of producing a wall finishing material which consists in treating wood particles with a solution of borax without destroying its granular form, and dyeing the thus treated particles.

2. The method of producing a wall finishing material which consists in treating solid particles of vegetable material to a boiling borax solution, drying the material, and subjecting it to treatment of a coloring matter prior to its application to a wall.

In testimony whereof I affix my signature in presence of two witnesses.

MICHAEL W. DUFFY.

Witnesses:
W. F. WAHRER,
T. L. COLGAN.